US009910659B2

(12) United States Patent
Krishnamurthy et al.

(10) Patent No.: US 9,910,659 B2
(45) Date of Patent: Mar. 6, 2018

(54) METHODS FOR PROVIDING ANTI-ROLLBACK PROTECTION OF A FIRMWARE VERSION IN A DEVICE WHICH HAS NO INTERNAL NON-VOLATILE MEMORY

(71) Applicant: QUALCOMM Incorporated, San Diego, CA (US)

(72) Inventors: Srilekha Krishnamurthy, San Diego, CA (US); Jeremy R. O'Donoghue, Wokingham (GB); Neeraj Bhatia, San Francisco, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/670,932

(22) Filed: Nov. 7, 2012

(65) Prior Publication Data

US 2014/0130151 A1 May 8, 2014

(51) Int. Cl.
*G06F 8/65* (2018.01)
*G06F 9/445* (2018.01)
(Continued)

(52) U.S. Cl.
CPC .............. *G06F 8/65* (2013.01); *G06F 21/572* (2013.01); *G06F 11/1433* (2013.01); *G06F 21/575* (2013.01)

(58) Field of Classification Search
CPC .... G06F 8/71; G06F 21/57; G06F 2221/2101; G06F 8/60; G06F 8/65; G06F 11/1433; G06F 21/575
(Continued)

(56) References Cited

U.S. PATENT DOCUMENTS 6,996,817 B2* 2/2006 Birum .................. G06F 8/65
707/999.202
7,222,340 B2* 5/2007 Willis, II ............ G06F 8/65
717/168
(Continued)

FOREIGN PATENT DOCUMENTS

CN 1678963 A 10/2005
CN 101507248 A 8/2009
(Continued)

OTHER PUBLICATIONS

Dietrich, et al., "Implementation Aspects of Mobile and Embedded Trusted Computing", Institute for Applied Information Processing and Communications, 2009, pp. 29-44.
(Continued)

*Primary Examiner* — Hadi Armouche
*Assistant Examiner* — Bryan Wright
(74) *Attorney, Agent, or Firm* — The Marbury Law Group

(57) ABSTRACT

Methods, systems, computer-readable media, and apparatuses for providing anti-rollback protection in a device which has no internal non-volatile memory are presented. One embodiment is a device for providing anti-rollback protection. The device may obtain a firmware version number associated with a first firmware installation for the device, wherein the device is implemented on a substrate that includes no non-volatile memory. The device may obtain a lowest acceptable firmware version number, wherein the lowest acceptable firmware version number is stored in a secure element environment, wherein the secure element environment utilizes memory separated from the substrate. The device may compare the firmware version number and the lowest acceptable firmware version number, wherein if the firmware version number is less than the
(Continued)

lowest acceptable firmware version number, then disallow the first firmware installation.

46 Claims, 8 Drawing Sheets

(51) Int. Cl.
    *G06F 11/14* (2006.01)
    *G06F 21/57* (2013.01)
(58) Field of Classification Search
    USPC .......................................................... 726/22
    See application file for complete search history.

(56) References Cited

U.S. PATENT DOCUMENTS

| | | | |
|---|---|---|---|
| 7,797,693 B1* | 9/2010 | Gustafson | G06F 11/1433 711/100 |
| 7,844,721 B2 | 11/2010 | Lee et al. | |
| 7,860,836 B1* | 12/2010 | Natanzon | G06F 11/1471 707/648 |
| 7,907,531 B2* | 3/2011 | Jha et al. | 370/241 |
| 8,588,756 B2* | 11/2013 | Baldan | G06F 21/54 235/375 |
| 8,737,911 B2 | 5/2014 | Black et al. | |
| 8,745,612 B1* | 6/2014 | Semenzato | G06F 8/65 717/170 |
| 9,110,761 B2* | 8/2015 | Nelson | G06F 8/665 |
| 2003/0115469 A1* | 6/2003 | Shippy et al. | 713/178 |
| 2003/0217357 A1* | 11/2003 | Parry | 717/168 |
| 2004/0045012 A1* | 3/2004 | Doraisamy | G06F 8/65 719/321 |
| 2005/0044401 A1* | 2/2005 | Morrow et al. | 713/200 |
| 2005/0132351 A1* | 6/2005 | Randall | G06F 11/1433 717/168 |
| 2005/0166200 A1* | 7/2005 | Willis, II | G06F 8/65 717/173 |
| 2008/0010638 A1* | 1/2008 | Klopfer | G05B 9/02 717/168 |
| 2008/0098212 A1* | 4/2008 | Helms et al. | 713/155 |
| 2008/0167130 A1* | 7/2008 | Kroeckel | G07F 17/3248 463/42 |
| 2008/0196024 A1* | 8/2008 | Barfield et al. | 717/177 |
| 2009/0100272 A1* | 4/2009 | Smeets | G06F 21/121 713/189 |
| 2010/0029247 A1* | 2/2010 | De Atley | H04W 8/265 455/411 |
| 2010/0031347 A1* | 2/2010 | Ohto | 726/19 |
| 2010/0050271 A1 | 2/2010 | Saarisalo | |
| 2010/0070966 A1* | 3/2010 | Perng | G06F 8/60 717/173 |
| 2010/0138931 A1 | 6/2010 | Thorley et al. | |
| 2012/0072734 A1* | 3/2012 | Wishman | G06F 21/60 713/189 |
| 2012/0084438 A1 | 4/2012 | Raleigh et al. | |
| 2012/0178367 A1* | 7/2012 | Matsumoto | G06K 19/0707 455/41.1 |
| 2012/0309311 A1* | 12/2012 | Ohira | G08C 17/02 455/41.1 |
| 2013/0125108 A1* | 5/2013 | Pawar | G06F 8/665 717/171 |
| 2013/0275736 A1* | 10/2013 | Kelley | G01D 4/004 713/1 |
| 2014/0108786 A1* | 4/2014 | Kreft | G06F 21/71 713/156 |
| 2014/0122329 A1* | 5/2014 | Naggar | G06Q 20/3552 705/41 |
| 2014/0250290 A1* | 9/2014 | Stahl | G06F 21/575 713/2 |

FOREIGN PATENT DOCUMENTS

| | | |
|---|---|---|
| CN | 101816148 A | 8/2010 |
| CN | 102662699 A | 9/2012 |
| JP | 2010501953 A | 1/2010 |
| WO | 2007120288 A2 | 10/2007 |
| WO | WO-2008028989 A1 | 3/2008 |
| WO | WO-2009068931 A1 | 6/2009 |
| WO | WO-2010132455 A2 | 11/2010 |

OTHER PUBLICATIONS

Kostiainen, et al., "Old, New, Borrowed, Blue—A Perspective on the Evolution of Mobile Platform Security Architectures", Proceedings of the First ACM Conference on Data and Application Security and Privacy, 2011, pp. 13-23.

International Search Report and Written Opinion—PCT/US2013/068874—ISA/EPO—dated Apr. 7, 2014.

Roland, M., "Software Card Emulation in NFC-enabled Mobile Phones: Great Advantage or Security Nightmare?", Jun. 18, 2012 (Jun. 18, 2012), XP055089033, Retrieved from the Internet: URL:http://www.medien.ifi.lmu.de/iwssi2012/papers/iwssi-spmu2012-roland.pdf, pp. 3, [retrieved on Nov. 19, 2013, Sections 2 and 2.2; Figures 1 and 2.

\* cited by examiner

METHODS FOR PROVIDING ANTI-ROLLBACK PROTECTION OF A FIRMWARE VERSION IN A DEVICE WHICH HAS NO INTERNAL NON-VOLATILE MEMORY

BACKGROUND

Aspects of the disclosure relate to devices with Near Field Communication (NFC) technology. NFC technology can establish radio communication between different devices by touching them together or bringing them into close proximity. NFC allows two-way communication. For example, NFC peer-to-peer communication can occur when both devices are powered. Additionally, communication is also possible between an NFC device and an unpowered NFC chip. For example, NFC can involve an initiator and a target, where the initiator generates a radio frequency field that can power a passive target (e.g., tags, key fobs, cards).

NFC technology can facilitate information exchange in secure transactions, such as payment transactions. NFC-enabled mobile devices can be used in contactless payment systems, similar to those currently used in credit cards and electronic ticket smartcards. For example, an NFC-enabled mobile device allows users to store financial accounts in a virtual wallet and then use the NFC-enabled mobile device at terminals that accept such payment methods. NFC-enabled mobile devices can also be used as identification for access control, such as replacing traditional keys for either physical access (e.g., hotel room) or control (e.g., starting a car). NFC can facilitate other types of information (e.g., transferring media between mobile phones, ticketing for venue entrance).

Given that the NFC-enabled mobile devices can be involved in secure transactions, it is important that the NFC-enabled mobile devices are protected from malicious attacks. While software security is generally provided by layering multiple approaches within the system, a key consideration is that the system should be running the latest and most secure versions of software.

A commonly used attack vector on a system is the rollback attack, in which a system is caused to run an older, insecure software version rather than the latest version. Running the older software version can make the system more vulnerable to potential attacks. Therefore, to prevent a rollback attack, the latest software version needs to be installed when updating or installing the software.

A current approach for anti-rollback protection is for the operating system of mobile device to check the version number of the software being installed or updated. However, it can be easy for attackers to find vulnerabilities in the operating system to manipulate the code and override this protection mechanism.

Another approach is to use e-Fuse technology to provide "last installed version" information. Since e-Fuses cannot be physically rewritten, they are fairly secure. However, this approach has some drawbacks, because there is typically a fixed and relatively low number of fuses available, and once these are exhausted, no further anti-rollback protection can be offered. Therefore, there is potential for a rollback attack once the e-Fuse cannot be updated with the correct revision number.

For example, every time there is an update to the version number, the e-Fuse is updated with the new version number. Therefore, if the e-Fuse technology allows ten updates, on the 11th update, the new version number cannot be stored on the e-Fuse.

Additionally, in the e-Fuse approach, physical access to the chip is required and this can only be implemented on a single chip. Therefore the e-Fuse approach is not scalable. In the e-Fuse approach, the implementation needs to occur in the chip manufacturing factory.

BRIEF SUMMARY

Certain embodiments are described that provide anti-rollback protection in a device which has no internal non-volatile memory.

Various embodiments of the present invention ensure that the new firmware version being downloaded onto a device is higher than the previous version, in order to prevent a rollback attack. Since firmware versions increase incrementally, by comparing the potential firmware upgrade version against a version number stored in a secure element environment, the device can be protected from a rollback attack. Additionally, since the version number is stored in the secure element environment of the mobile device, the present invention provides anti-rollback protection during startup, even when the device is without internal non-volatile memory. Furthermore, embodiments of the present invention can protect against software and hardware attacks.

One embodiment comprises of a method for providing anti-rollback protection in a device comprising: obtaining a firmware version number (FVN) associated with a first firmware installation for the device, wherein the device is implemented on a substrate that includes no non-volatile memory; obtaining a lowest acceptable firmware version number (LAFVN), wherein the LAFVN is stored in a secure element environment, wherein the secure element environment utilizes memory separated from the substrate; and comparing the FVN and the LAFVN, wherein if the FVN is less than the LAFVN, then disallowing the first firmware installation.

Another embodiment comprises of a device for providing anti-rollback protection comprising: one or more processors; and memory storing computer-readable instructions that, when executed by the one or more processors, cause the device to: obtain a firmware version number (FVN) associated with a first firmware installation for the device, wherein the device is implemented on a substrate that includes no non-volatile memory; obtain a lowest acceptable firmware version number (LAFVN), wherein the LAFVN is stored in a secure element environment, wherein the secure element environment utilizes memory separated from the substrate; and compare the FVN and the LAFVN, wherein if the FVN is less than the LAFVN, then disallow the first firmware installation.

Another embodiment comprises of one or more computer-readable media storing computer-executable instructions that, when executed, cause a device to: obtain a firmware version number (FVN) associated with a first firmware installation for the device, wherein the device is implemented on a substrate that includes no non-volatile memory; obtain a lowest acceptable firmware version number (LAFVN), wherein the LAFVN is stored in a secure element environment, wherein the secure element environment utilizes memory separated from the substrate; and comparing the FVN and the LAFVN, wherein if the FVN is less than the LAFVN, then disallow the first firmware installation.

Another embodiment comprises of A device for providing anti-rollback protection comprising: one or more processors; means for obtaining a firmware version number (FVN) associated with a first firmware installation for the device, wherein the device is implemented on a substrate that includes no non-volatile memory; means for obtaining a lowest acceptable firmware version number (LAFVN), wherein the LAFVN is stored in a secure element environment, wherein the secure element environment utilizes memory separated from the substrate; and means for comparing the FVN and the LAFVN, wherein if the FVN is less than the LAFVN, then disallowing the first firmware installation.

BRIEF DESCRIPTION OF THE DRAWINGS

Aspects of the disclosure are illustrated by way of example. In the accompanying figures, like reference numbers indicate similar elements, and.

DETAILED DESCRIPTION

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

NFC technology can require that an NFC controller (NFCC) is used as a transport for sensitive or valuable information (e.g. payment transactions). However, NFC technology can also be vulnerable to eavesdropping. Therefore, the NFCC needs to be secure from eavesdropping, such as being used as an attack vector on the data it is used to transport. In particular, it is desirable to ensure that the NFCC cannot be used as the host of a Man-in-the-Middle (MITM) attack on the data it transports.

A MITM attack is a form of active eavesdropping in which the attacker makes independent connections with the victims (e.g., initiator, target) and relays messages between them, making the victims believe that they are talking directly to each other, when in fact the conversation is controlled by the attacker.

A MITM attack can be hosted by the NFCC, if the NFCC is running an older version of the firmware, especially when the older version has known security issues. For example, during a firmware update, a high-level application running on the mobile device can configure the NFCC and request a firmware installation (e.g., patch) on the NFCC. However, an attacker can use the firmware installation request to rollback the firmware on the NFCC to an older version. The high-level application may use a standard protocol to communicate with the NFCC (e.g., NFC Controller Interface (NCI)) or it may use a proprietary mechanism. The present invention can provide anti-rollback protection during a firmware installation.

Figure 1A:
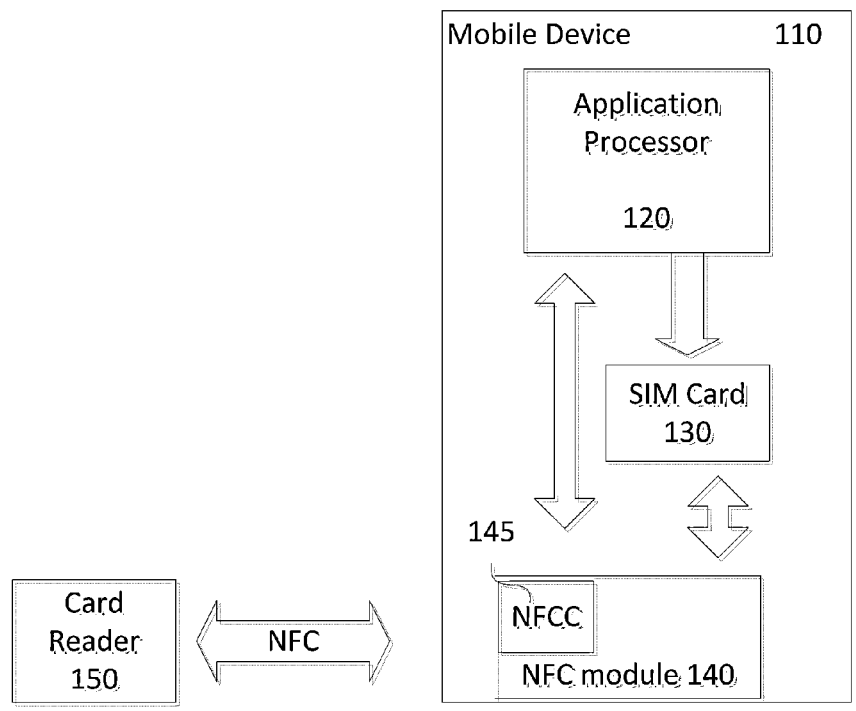
FIG. 1A illustrates a simplified diagram of a system with an NFC-enabled mobile device that may incorporate one or more embodiments.

FIG. 1A illustrates a simplified diagram of a system with an NFC-enabled mobile device that may incorporate one or more embodiments.

The NFC module 140 according to an embodiment of the present invention, which is shown in FIG. 1A, may be mounted in a mobile device 110. The mobile device 110 can also include an application processor 120 and a Subscriber Identity Module (SIM) card 130. The NFC module 140 may communicate via contact or non-contact NFC to a card reader 150. The NFC module 140 can include an NFC controller (NFCC) 145. According to this embodiment, the NFCC 145 is embedded in the NFC module 140. The application processor can include a high-level application (e.g., a payment processing application, operating system) to communicate with the NFC module 140 and the NFCC 145.

An example of an NFC-enabled mobile device communication can include a user who desires to pay a retailer for goods purchased using the mobile device. The mobile device may transmit personal financial information (e.g., credit card account information) to a point of sale card reader 150 located at checkout. The user may bring the mobile device 110 equipped with the NFC module 140 close to the card reader 150 to complete the purchase. The card reader 150 receives the user's credit card details, which usually are stored in a secure environment of the mobile device 110, via NFC and processes the payment with conventional methods and returns to the user an electronic receipt which can be stored in the mobile device 110.

Figure 1B:
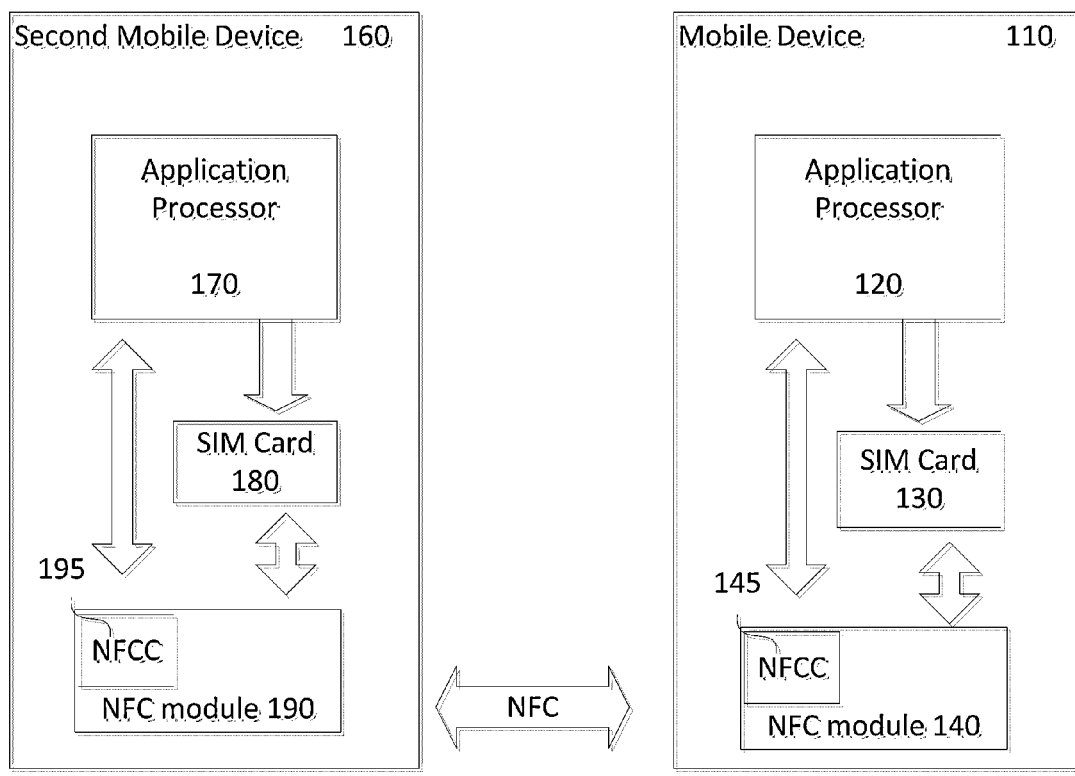
FIG. 1B illustrates a simplified diagram of a peer-to-peer communication system with at least two NFC-enabled mobile devices that may incorporate one or more embodiments.

Furthermore, a second NFC module 190, according to an embodiment of the present invention, may be mounted in a second mobile device 160 and enable peer-to-peer communication with the mobile device 110, as shown in FIG. 1B. Similar to the mobile device 110, the second mobile device 160 can also include an application processor 170, a SIM card 180 and a second NFC module 190. The second NFC module 190 can include a second NFCC 195.

An example of peer-to-peer communication can include a user transferring images, videos and other information to a second user via NFC by both parties bringing their NFC-enabled mobile devices within close proximity of each other. When the devices are in close proximity, the NFC module 140 can attempt to transmit information, including authentication information, to the second NFC module 190. After the second NFC module 190 receives the information and performs the authentication, the two devices can share information.

According to some embodiments, the mobile device 110 utilizes the NFC module 140 in conjunction with retrieving or storing data in a secure environment. For example, the mobile device 110 can obtain credit card data stored in the secure element environment and transport it via the NFC module 140. Additionally, NFC-enabled mobile devices most likely can include a secure element environment, because NFC may be used for handling sensitive information (e.g., in conducting a financial transaction). Therefore, the present invention can utilize the secure element environment to store the version number when the device (e.g., NFCC 145) has no internal non-volatile memory.

A mobile credit card payment processing transaction is one example of a transaction involving mobile device 110 utilizing the NFCC 145 in conjunction with a secure element environment. In this example, the NFCC 145 can be a middle party between the secure element environment, where the credit card information is stored, and the application processor 120 which is used to facilitate the transaction. Therefore, an application processor 120 used for payment processing by the mobile device can transmit sensitive financial information to the card reader 150 by using the NFCC 145. Additionally, both the application processor 120 and the NFCC 145 can communicate with the secure element environment to retrieve sensitive data in order to enable this payment processing transaction.

The above example illustrates that since the NFCC 145 handles sensitive information, the NFCC can also have access to the secure element environment of the mobile device 110. Additionally, the NFCC 145 may have a firmware component, which may have periodic firmware upgrades. Therefore from a security perspective, the firmware on the NFCC 145 should be prevented from being rolled back to an older version, especially, if the older version had some security problems associated with it. An older firmware version on the NFCC 145 may be used to corrupt the NFCC 145 in order to use the NFCC 145 as the mechanism for a MITM attack.

Therefore, to prevent a rollback attack, the latest firmware version needs to be installed when updating the firmware on the NFCC 145. According to some embodiments of the present invention, the NFCC 145 can check the firmware version number (FVN) of installation file that the mobile device wants to install against the current firmware version number. This can be done by storing a least acceptable firmware version number (LAFVN), which can be associated with the current firmware version number, in a secure element environment of the mobile device 110. The LAFVN can be used to compare against the FVN to prevent a rollback.

The present invention may ensure that the new firmware version being downloaded onto the NFCC 145 is higher than the previous version, in order to prevent a rollback attack. Since firmware versions increase incrementally, by comparing the potential firmware upgrade version against a LAFVN, the NFCC 145 can be protected from a rollback attack. Additionally, since the LAFVN is stored in the secure element environment of the mobile device, the present invention still provides anti-rollback protection during startup, even when the device (e.g., NFCC 145) is without non-volatile memory.

An approach for anti-rollback protection in software systems has been to include the use of non-volatile memory in the device (e.g., NFCC 145). However, this approach requires the presence of rewritable non-volatile memory in the device (e.g., NFCC 145), which is both costly and relatively unreliable, especially when the device is implemented in small geometries (e.g., <65 nm).

For example, the NFCC 145 can be manufactured into the surface of a thin substrate of semiconductor material. Integrated Circuits (ICs) used to implement devices such as NFCC 145 have migrated to smaller geometries allowing more circuitry to be packed on each chip. This increased capacity per unit area can be used to decrease cost and/or increase functionality. However, ICs with nanometer-scale devices are not without their problems, principal among which is leakage current. Therefore, design rules are provided by semiconductor manufacturers to ensure that the ICs work correctly. A design rule set specifies certain geometric and connectivity restrictions to ensure sufficient margins to account for variability in semiconductor manufacturing processes. Therefore, when a device (e.g., NFCC 145) is implemented in small geometries (e.g., <65 nm), the device may be designed without non-volatile memory, which may be based on the design rules.

Therefore, some devices (e.g., NFCC 145) might not have access to non-volatile memory, because the substrate that the device is manufactured on does not support non-volatile memory. According to embodiments of the invention, anti-rollback protection is provided by storing a least acceptable firmware version number in a secure location. The mobile device can include other components that are manufactured on other substrate which does support non-volatile memory. For example, the secure element environment can be manufactured on another substrate, which does not have small geometries and may include non-volatile memory. Therefore, according to some embodiments, the least acceptable firmware number can be stored in the non-volatile memory of the secure element environment.

Previous methods of anti-rollback protection include storing the least acceptable firmware version number at the application level. However, the application level may not be secure enough since high-level applications in the mobile device may be easily attacked.

For example, the high level software application can be an application at the operating system level. However, the source code for the operating system (e.g., Android operating system) can be open source code. Therefore the open source code can be vulnerable to attacks. It can be easy for attackers to find vulnerabilities in the software and therefore it is best practice to not store highly sensitive information in a high level software application.

For example, a high level software application can vulnerable to a looping attack, which can result in the attacker getting super user privileges on the mobile device. With super user privileges, the attacker can control the NFCC 145. Therefore, from a security perspective, it is not best practice to store sensitive information at the high level software application layer because it can be manipulated.

Embodiments of the present invention overcome the shortfalls mentioned above, by storing the version number of the firmware in the secure element environment. The present invention can take advantage of the fact that NFC-enabled mobile device 110 also include a secure element environment. Therefore, by storing the version number at the secure element environment instead of the high level software application layer, the mobile device can be less vulnerable to attacks. In some embodiment, the secure element environment is a secure memory execution partition that cannot be accessed or tampered by any external program, bus or device port.

Furthermore, unlike the e-Fuse approach previously mentioned, in the embodiments of present invention, there may not be a limit to the number of times the version number is updated. The secure element environment may always be rewritten to include the updated version number. By storing the version number in the secure element environment of the mobile device 110, it can result in a more robust system because it can provide better anti-rollback protection.

Embodiments of the present invention can provide anti-rollback protection without the use of non-volatile memory. Non-volatile memory can be costly and can be unreliable in small geometries (e.g., <65 nm). As previously mentioned, the NFCC may be embodied on a chip which is manufactured on a substrate with small geometries. Therefore, the NFCC may not have internal non-volatile memory. Additionally, the cost pressures on NFCC implementations mean that it is desirable to find a mechanism which provides protection against rollback attacks without the use of internal non-volatile memory. Furthermore, it may possible to modify the non-volatile memory using a hardware attack to permit a rollback to an older firmware version.

Therefore, when an NFCC firmware upgrade is initiated, embodiments of the present invention check the version number against the LAFVN stored in the secure element environment, to make sure that the version number is going up in order to provide anti-rollback protection against hardware and software attacks.

Secure Execution Environment

According to embodiments of the present invention, two different types of secure element environments are considered. These are the Stand-alone Secure Element, a.k.a., Secure Execution Environment (SEE) and the Trusted Execution Environment (TEE).

The SEE is comprised of software and tamper-resistant hardware. The TEE is described in the Trusted Execution Element section. The SEE functions like a guard, because it is specifically designed to be tamper-resistant and store sensitive information. It can provide high levels of security and can work with the TEE (described in more detail in section below). For example, the secure element environment can be utilized by a mobile payment application because of the high level of security provided by the secure element environment. In some embodiments, the SEE is a secure memory execution that cannot be accessed by external programs. Additionally, the SEE may enforce instructions in accordance to policies stored in the SEE.

The SEE is specifically designed to protect against hardware attacks. For example, a hardware attack can be an invasive attack. An invasive attack can include de-packaging the chip and using acid to remove the passivation layer in order to get electrical contact to the internal lines. Additionally, a hardware attack can also be semi-invasive attack. A semi-invasive attack can include de-packaging the chip to get access to its surface but the passivation layer remaining intact.

Unlike previous methods for anti-rollback protection (e.g., TrustZone technology, software-based version control) which only provide protection against software attacks, the present invention provides anti-rollback protection against software and hardware attacks. By storing the firmware version number in the SEE, the present invention can protect against software and hardware attacks. The present invention takes advantage that the secure element environment already exists in NFC-enabled mobile devices.

The SEE is specifically designed to store sensitive information because of its security features (e.g., secure fire system, data partitions, access control, separate operating system). Additionally, the SEE can be isolated from other portions of the stack. Therefore, the SEE's properties make it an ideal location to store data. For example, a SIM card, which also stores sensitive subscription keys for the cellular network, can be a SEE.

According to some embodiments, the SEE may include non-volatile memory. As previously mentioned, the SEE may be manufactured on a different substrate than the NFCC 145. For example, the SEE may be manufactured on a substrate that can be designed with non-volatile memory.

According to different embodiments, the secure element environment can be a SEE (e.g., a SIM card) or a TEE (e.g., a hardware partitioned secure section of a chip). NFC enabled mobile devices may have the secure element environment connected to the NFCC 145. Therefore, the NFCC 145 may interface with the secure element environment to obtain sensitive data.

According to another embodiment, a controlling authority (e.g., Original Equipment Manufacturer (OEM)) may have an OEM-controlled secure element environment in addition to a SIM card. In this embodiment, the NFCC 145 might not have access to the SIM card, but has access to the OEM-controlled secure element environment. Therefore the secure element environment which is controlled by the OEM is also used by the NFCC 145. This may provide greater security, because a SIM card may be removable and interchangeable.

Therefore by storing the version number in the secure element environment, it can make it harder for an attacker to rollback the firmware to an older version, because the attacker needs to compromise the secure element environment which is not as simple as compromising other portions of the stack. From a security perspective, storing the version number in the secure element environment lowers the risk of an attacker corrupting the version number.

Figure 2A:
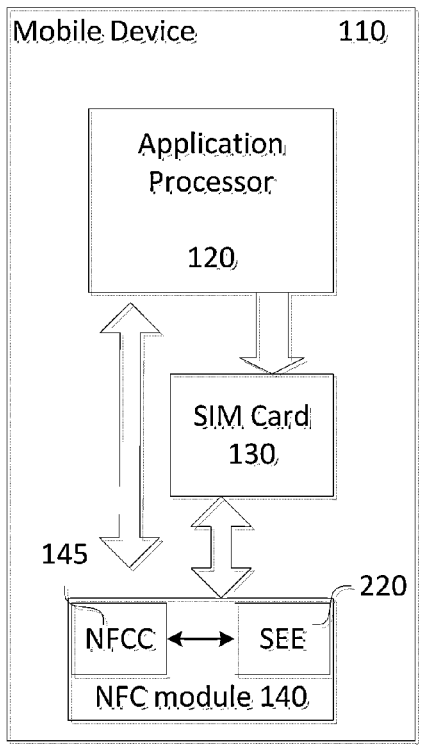
FIG. 2A illustrates a block diagram showing the NFC-enabled mobile device according to an embodiment of the present invention.

FIG. 2A is a block diagram showing the NFC-enabled mobile device 110 according to an embodiment of the present invention. Referring to FIG. 2A, the mobile device 110 includes an application processor 120, a SIM card 130 and an NFC module 140 which includes the NFC controller (NFCC) 145. According to this embodiment, a secure element environment (e.g., Secure Execution Environment (SEE) 220) is also embedded in the NFC module 140. The application processor can include a high-level application (e.g., a payment processing application, operating system) to communicate with the NFC module 140 and the NFCC 145.

As illustrated in FIG. 2A, the SEE 220 can be embedded in the NFC module 140. An example of this embodiment includes an NFC chip with an embedded SEE. In this example, the NFC module may not need to communicate with the SIM card in order to receive the last installed version number.

Figure 2B:
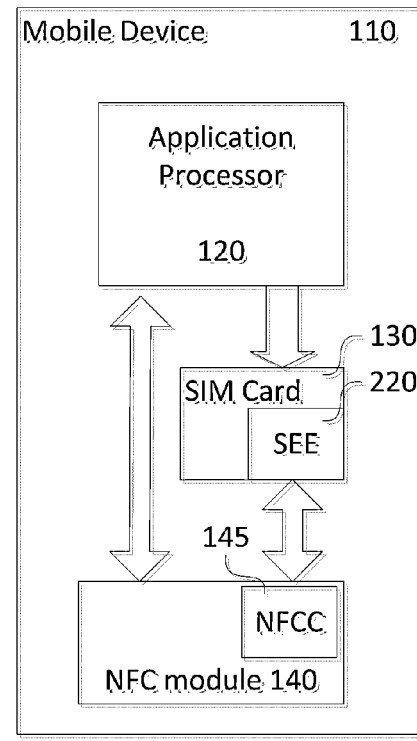
FIG. 2B illustrates a block diagram showing the NFC-enabled mobile device according to another embodiment of the present invention.

FIG. 2B is a block diagram showing the NFC-enabled mobile device according to another embodiment of the present invention. According to this embodiment, the SEE 220 is embedded in the SIM card 130. In this example, the NFC module may communicate with the SIM card 130 in order to receive the last installed version number.

Figure 2C:
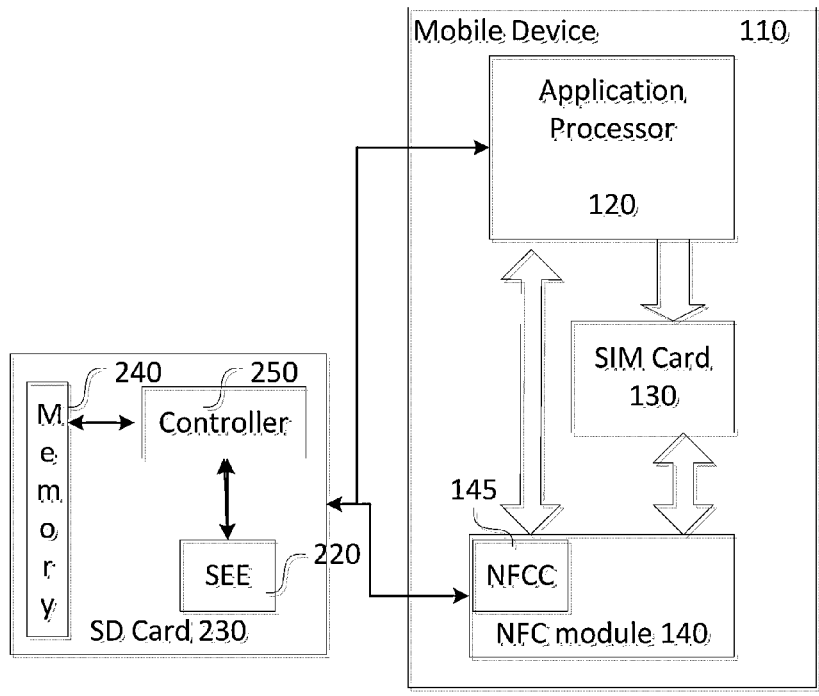
FIG. 2C illustrates a block diagram showing the NFC-enabled mobile device according to another embodiment of the present invention.

FIG. 2C is a block diagram showing the NFC-enabled mobile device according to another embodiment of the present invention. According to this embodiment, the SEE 220 is stored in an external SD card 230. The SD card 230 may include a memory 240 and a controller 250 that can communicate with the SEE 220. In this example, the NFC module may communicate with the SD card in order to receive the last installed version number, and the NFC module may not need to communicate with the SIM card 130.

Trusted Execution Environment

According to another embodiment, the secure element environment can be a TEE. The TEE is a secure area that can reside in the main processor of a mobile device. Similar to the SEE, the TEE can ensure that sensitive data is stored, processed and protected in a trusted environment. The TEE can execute authorized security software (e.g., trusted applications) and provide end-to-end security by enforcing protection, confidentiality, integrity and data access rights. The TEE can be made up of software and hardware and can be used to provide an additional level of protection against software attacks. The TEE assists in the control of access rights and stores sensitive applications. For example, the TEE can be a secure area in a hardware protected partition of a System-on-a-Chip (SoC). Another example of a TEE can include a secure storage with a unique device key and an execution environment in which code can be executed isolated from the rest of the mobile device. The TEE may also filter access to information stored directly on the SEE.

The TEE is an isolated environment that runs in parallel with the operating system and can provide security services to the mobile device. The TEE may be more secure than the operating system, but may not be as secure as the SEE. Therefore, the TEE may offer a secure environment between the high-level protection of the SEE and the low-level protection of the operating system.

According to some embodiments, the TEE can include non-volatile memory. As previously mentioned, the chip which includes the TEE can be manufactured on a different substrate than the NFCC 145. For example, a chip that includes the TEE may may be designed with non-volatile memory.

Utilizing the SEE and/or TEE for Anti-Rollback Protection

Figure 3:
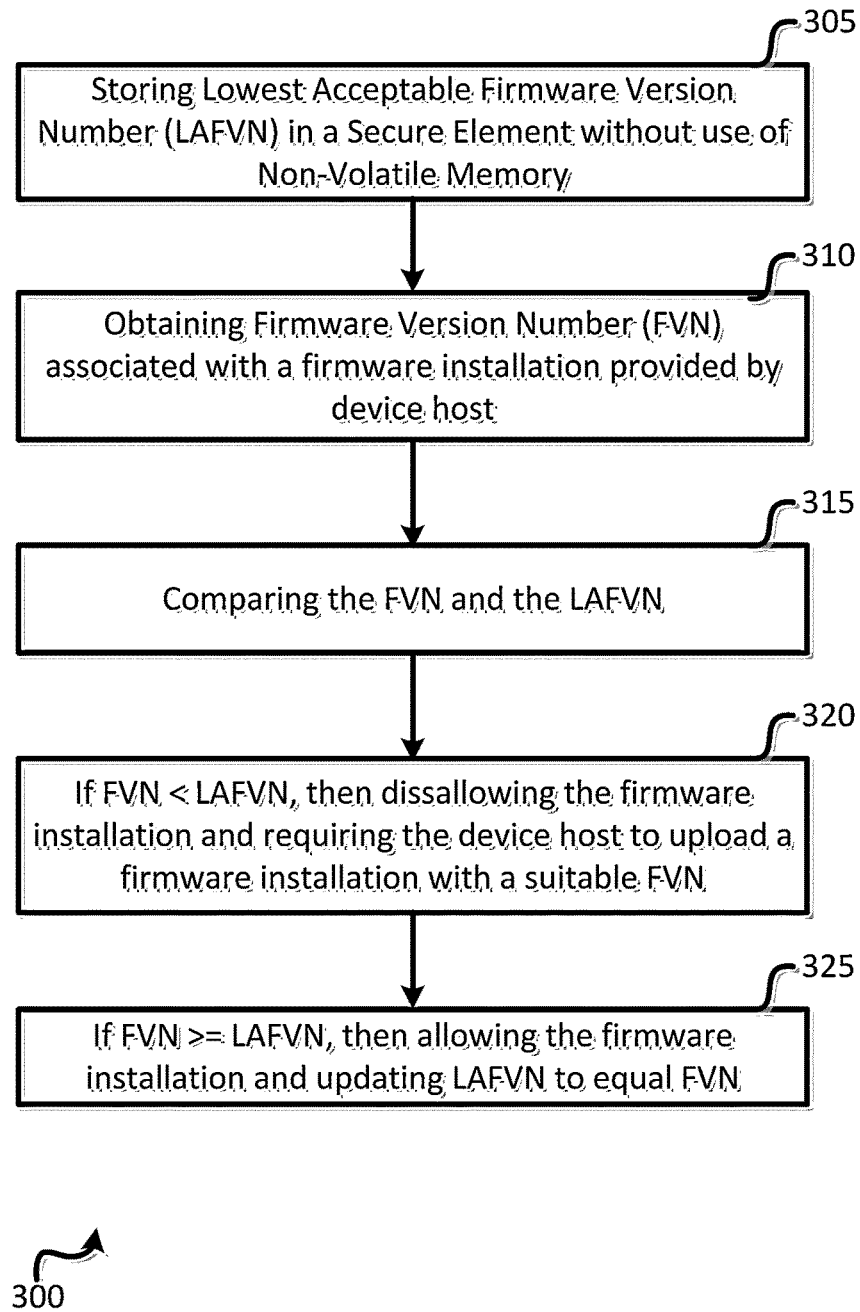
FIG. 3 illustrates an example method of providing anti-rollback protection according to some embodiments.

FIG. 3 is a flowchart outlining a sequence of steps 300 for providing anti-rollback protection for a device (e.g., NFCC 145) without non-volatile memory. The operation starts at step 305 as the mobile device stores the Lowest Acceptable Firmware Version Number (LAFVN) in a secure element environment. As previously mentioned, the SEE and TEE are two examples of secure element environments. The LAFVN can correspond to the current version number of the firmware running on the NFCC 145. By storing the current version number in a secure location, the present invention may prevent rollback and MITM by protecting against software and hardware attacks.

Next, in step 310, the NFC module 140 obtains the firmware version number (FVN) associated with the firmware installation request by the mobile device. A high level application or a controlling authority can request the firmware installation. The NFC module 140 can receive the firmware installation request from the application processor 120. Additionally, the NFCC 145 can directly receive the firmware installation request to update the NFCC firmware.

Then in step 315, the NFC module 140 compares the LAFVN with the FVN. Additionally, the NFCC 145 can also do the comparison. If the comparison indicates that the FVN is less than the LAFVN, which can result in the new installation to rollback the firmware to an older version, then the embodiments of the present invention can disallow the new installation from proceeding.

As illustrated in step 320, the NFC module 140 can disallow the firmware installation and require the mobile device 110 to upload a firmware installation with a suitable FVN (e.g., FVN being at least equal to the LAFVN). According to another embodiment, the application processor 120, the NFC module 140 or the NFCC 145 can disallow the firmware installation. To illustrate this step, the following example is described, wherein the mobile device 110 using the application processor 120 can request a firmware upgrade associated with an FVN on the NFCC 145. The NFCC 145, in order to prevent a rollback of the firmware to an older version, can retrieve the LAFVN from the secure element environment and compare the FVN with the LAFVN. If the comparison indicates that the FVN is less than LAFVN, then the NFCC disallows this firmware installation because it may be a rollback to an older firmware version.

For example, the FVN received is a version number 1.2, and the NFCC checks to make sure it is higher or equal to the LAFVN stored in the secure element environment. In this example, the LAFVN stored in the secure element environment is version number 1.3. Once the NFCC 145 receives the version number, it compares the two values. In this example, the comparison would indicate that the FVN is not higher or equal to the LAFVN; therefore the NFCC 145 will not allow the installation. The NFCC 145 can communicate to the mobile device 110 that it cannot install version number 1.2 because the version number stored in the secure element environment is 1.3, and the next firmware upgrade needs to be higher or equal to version 1.3.

Alternatively, if the comparison indicates that the FVN is equal to or greater than the LAFVN, then the process continues to step 325. In step 325, the firmware installation is allowed by the mobile device 110. The NFC module 140 or the NFCC 145 can allow the firmware installation. To illustrate this step the following example is described, wherein the mobile device 110 using the application processor 120 can request a firmware upgrade associated with an FVN on the NFCC 145. The NFCC 145, in order to prevent a rollback of the firmware to an older version, can retrieve the LAFVN from the secure element environment and compare the FVN with the LAFVN. In this example, the comparison results in the FVN being greater than the LAFVN, then the NFCC 145 can allow this firmware installation because the firmware is an upgrade from the current version running on the NFCC 145.

Additionally, if the FVN is greater than the LAFVN, the LAFVN can be updated to equal the FVN. The methods for updating the secure element environment are discussed in more detail in FIG. 6 and FIG. 7.

Figure 4:
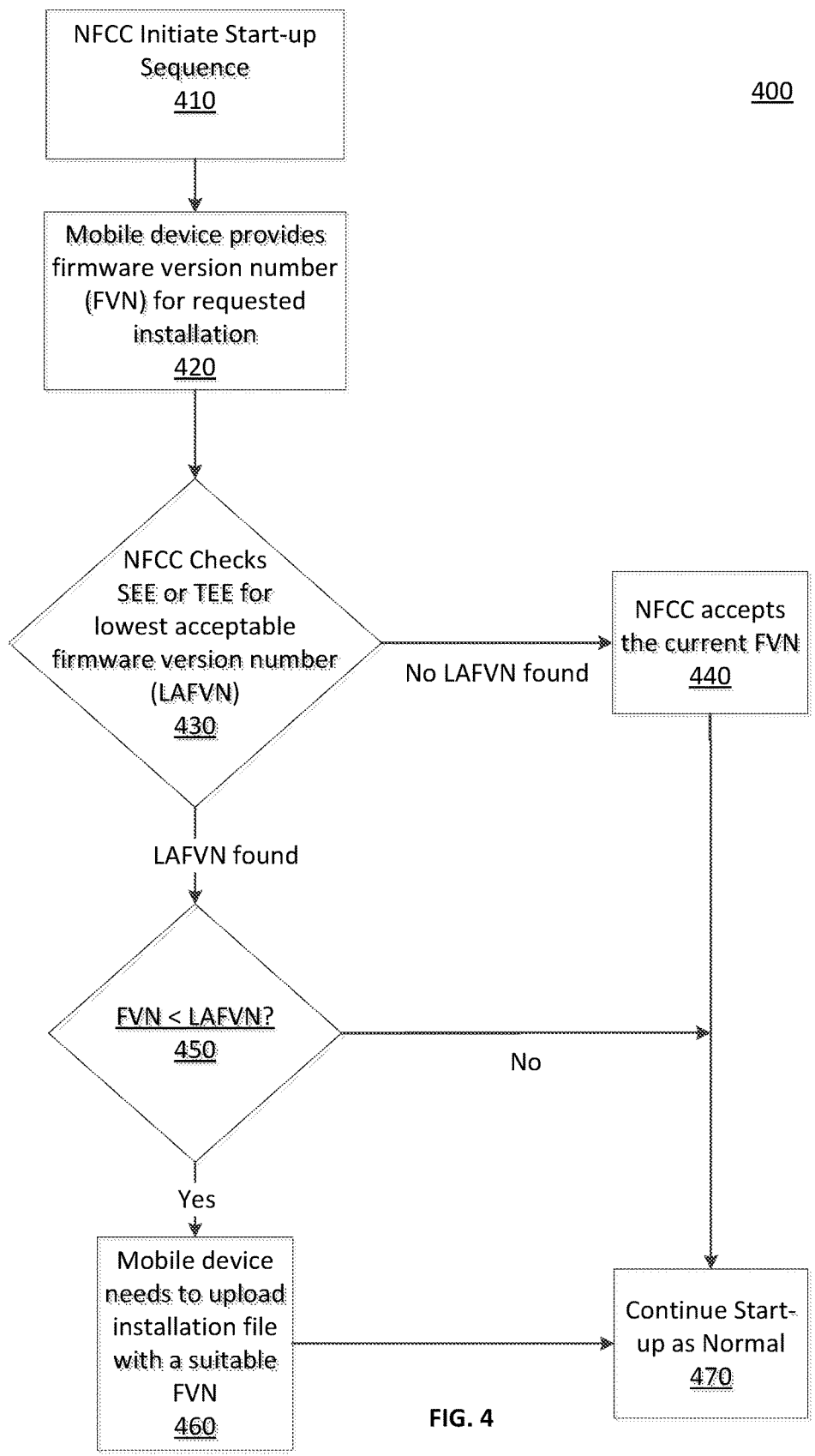
FIG. 4 illustrates an example of a system-level flowchart according to some embodiments.

While FIG. 3 illustrates a method for providing anti-rollback protection according to an embodiment of the present invention; FIG. 4 illustrates a system-level flowchart according to an embodiment of the present invention.

FIG. 4 is a flowchart outlining the communication steps 400 between the components in the mobile device according to an embodiment of the present invention. For example, at step 410, the start-up sequence for the NFCC 145 is initiated. During a start-up sequence, the NFCC 145 can be particularly vulnerable to a rollback, especially when there is no internal non-volatile memory. The start-up sequence can be initiated by any component that has such authority (e.g., mobile device, the control authority, high level application, application processor). At step 420, for example, the mobile device provides a firmware version number (FVN) associated with the requested firmware installation. The FVN can be given to the NFCC 145 by any component that can provide the requested firmware installation file to the NFCC 145.

Once the NFCC 145 receives the FVN, at step 430, the NFCC 145 checks a specific application or file stored in the SEE or TEE for the lowest acceptable firmware version number (LAFVN) that is allowed to run in the NFCC 145. If no such application or file is found, then as shown in step 440, the NFCC accepts the FVN and continues to step 470. According to another embodiment, when the NFCC 145 checks the secure element environment and there is no version stored in the secure element environment, the NFCC 145 can write the revision number into the secure element environment.

Alternatively, if an application or file is found in step 430, then the process goes to comparison step 450. The comparison step 450 is similar to the comparison step 315 from FIG. 3. If the comparison step indicates that the FVN is not less than the LAFVN, then start-up continues as normal and proceeds to step 470. However, if the comparison step indicates that the FVN is less than the LAFVN, then it goes to step 460, where the NFCC 145 tells the mobile device 110 that the start-up can only continue after a suitably updated firmware version has been uploaded.

Figure 5:
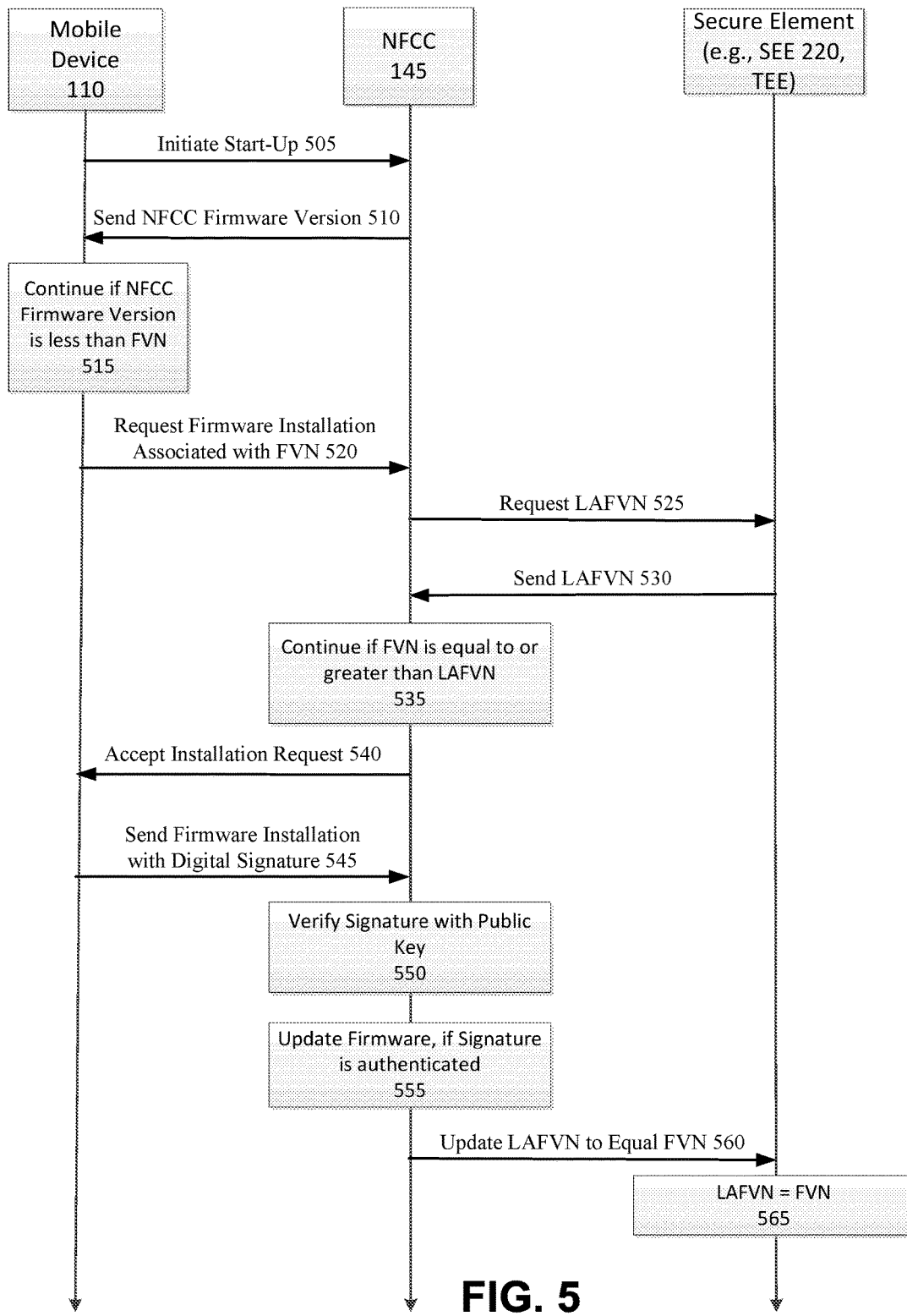
FIG. 5 illustrates an example of an NFCC start-up, firmware installation and signature authentication according to some embodiments.

While FIG. 4 illustrated an example of anti-rollback protection, FIG. 5 illustrates an example of anti-rollback protection with an authentication feature. According to this embodiment, if the attacker tries to load an un-authenticated firmware version, the firmware will not be uploaded because it is not signed with an authenticated signature key. The attacker might find the vulnerabilities in older revisions of the firmware and try to upload the older firmware revision. Therefore, an older revision but a signed revision might be used by an attacker, unless an anti-rollback mechanism is installed. According to embodiments of the present invention, as further described in FIG. 5, the NFCC 145 can provide verification in addition to anti-rollback protection.

FIG. 5 illustrates an exemplary embodiment of the communication steps 500 between the mobile device 110, the NFCC 145 and the secure element environment during an NFCC start-up and firmware installation request. According to this embodiment, the mobile device 110 can initiate the NFCC 145 to start-up at step 505. At step 510, the NFCC 145 wakes up and send the current version number of the firmware running on the NFCC. Alternatively, the mobile device 110 can parse through the received acknowledgment by the NFCC to obtain the NFCC firmware version. For example, the CORE_INIT_RSP sent by the NFCC contains the firmware version information in the "Manufacturer Specific Information" octets.

At step 515, which can be an optional step, the mobile device can compare the FVN associated with the request firmware installation with the NFCC firmware version. The mobile device can continue with the installation request if the NFCC firmware version is less than FVN. This optional step 515 can be used to prevent a firmware upgrade request, when the firmware on the NFCC is already current.

At step 520, the mobile device 110 can request a firmware installation on the NFCC 145, wherein the firmware installation is association with an FVN. The firmware installation can be a full firmware installation or a partial installation (e.g., patch installation). After receiving this request, at step 525, the NFCC 145 probes the attached secure element environment for the LAFVN. According to another embodiment, if the NFCC 145 does not find the secure element environment or the LAFVN, then the NFCC 145 continues with the normal start-up sequence and installs the firmware.

The NFCC 145 may be required to use different communication mechanism to communicate with the secure element environment. For example, a standard mechanism (e.g., a Qualcomm non-volatile application) can be used to communicate with the secure element environment. According to another embodiment, there may be multiple secure element environments and the NFCC 145 may probe different secure element environment instances for a version number. For example, the mobile device may have a secure element environment which is the SIM card, but also have an OEM controlled secure element environment. This can provide redundancy, because the carrier can enforce the anti-rollback protection through the SIM card, and the OEM can provide the anti-rollback protection to an OEM controlled secure element environment.

At step 530, the secure element environment can send the LAFVN to the NFCC 145. Alternatively, the secure element environment can simply verify (i.e., true or false) that the FVN is the last firmware version.

At step 535, the NFCC 145 compares the FVN with the LAFVN, and if the LAFVN is not less than the FVN, then the NFCC 145 continues with the firmware installation. At step 540, the NFCC accepts the installation request from the mobile device 110.

Additionally, installation of any firmware onto the NFCC 145 should not be allowed from an unknown source. From a security perspective, there needs to be a mechanism to only allow a trusted party to upgrade the firmware on the NFCC 145. Therefore, according to some embodiments, the source digitally signs a firmware installation file before it is loaded onto the NFCC 145.

By verifying the source of the upgrade, the present invention adds another layer of protection against attacks. For example, some malicious entity can upload code which would enable the malicious entity to take over the NFCC 145. Without any mechanism to authenticate the upgrade, the upgrade process can go through and bad code may potentially be loaded onto the NFCC 145. To prevent such attacks, the NFCC 145 has the public key and it can verify whether the upgrade is from a trusted party.

The signature verification can be initiated at step 545, where the mobile device 110 sends the firmware installation with a digital signature.

In step 550, the NFCC 145 can verify the signature received with a public key to ensure that the firmware is coming from a trusted source. For example, a Public Key Infrastructure (PKI) authentication is a common method for such verification. If the firmware provided is not from a trusted source, the installation is not allowed to proceed. If the verification process fails, the NFCC 145 signals to mobile device 110 that the signature is not authentic and therefore the upgrade is not going to occur.

At step 555, if the signature is verified to be valid, then the firmware installation is allowed and the firmware is updated.

After the firmware associated with FVN is updated, according to some embodiments, the NFCC 145 can request the secure element environment to update the LAFVN to equal the FVN, as shown in step 560. In step 565, the secure element environment can update the LAFVN to equal the FVN.

Updating the LAFVN after an Firmware Installation

The LAFVN stored in the secure element environment can be updated under several circumstances. First, when a new firmware installation associated with an FVN is uploaded, and its version number is greater than the LAFVN stored in the secure element environment, then the LAFVN is updated to equal the FVN, as described in FIG. 6. Alternatively, as described in FIG. 7, a controlling authority for the secure element environment can directly force an update.

As shown in steps 560 and 565 in FIG. 5, after the NFCC 145 successfully upgrades its firmware, the NFCC 145 can communicate to the secure element environment to upgrade the version number currently stored.

Figure 6:
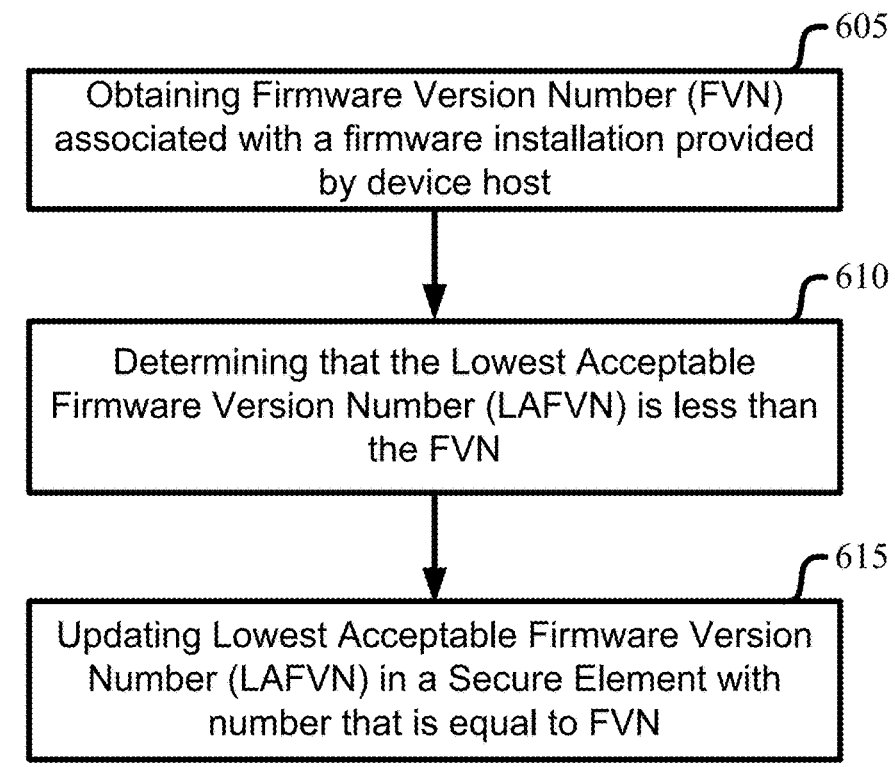
FIG. 6 is an example method of updating the last installed firmware version number stored in the secure environment according to some embodiments.

FIG. 6 is a flowchart outlining a sequence of steps 600 for updating the LAFVN when the LAFVN is less than the FVN. The NFCC 145 can use standard mechanisms (e.g., GlobalPlatform) to communicate with the secure element environment and update the LAFVN stored in the secure element environment.

As shown in step 605, the FVN associated with the firmware installation is provided to the NFCC 145 by the mobile device 110. In step 610, the NFCC 145 can determine that the LAFVN, which is stored in the secure element environment, is less than the FVN. Therefore, in step 615, the NFCC 145 can update the LAFVN to equal the FVN. As previously mentioned, this update can be done using standard mechanisms (e.g., GlobalPlatform) to re-write the version number in the secure element environment.

According to another embodiment, in the natural incremental example, the LAFVN is naturally incremented to the latest version number once a newer firmware is uploaded. Therefore, once a higher version is uploaded, the LAFVN can be incremented to that number in the secure element environment.

Updating the LAFVN after Forced Update

According to an embodiment of the present invention, a controlling authority (e.g., OEM, secure element authority) may only want the NFCC 145 with revision numbers above a threshold (e.g., ten) to communicate with the controlling authority. For example, an OEM or a carrier may decides to make it a requirement that phone revision must be at least ten to talk to the secure element authority, because it is known that the phone revision number below ten has security vulnerabilities.

According to this embodiment, the controlling authority may directly upgrade the LAFVN that it stored in the secure element environment. Secure protocols exist for modifying data on the secure element environment. Additionally, the controlling authority may own the long term keys on the secure element environment so it has the ability to upgrade the secure element environment.

Figure 7:
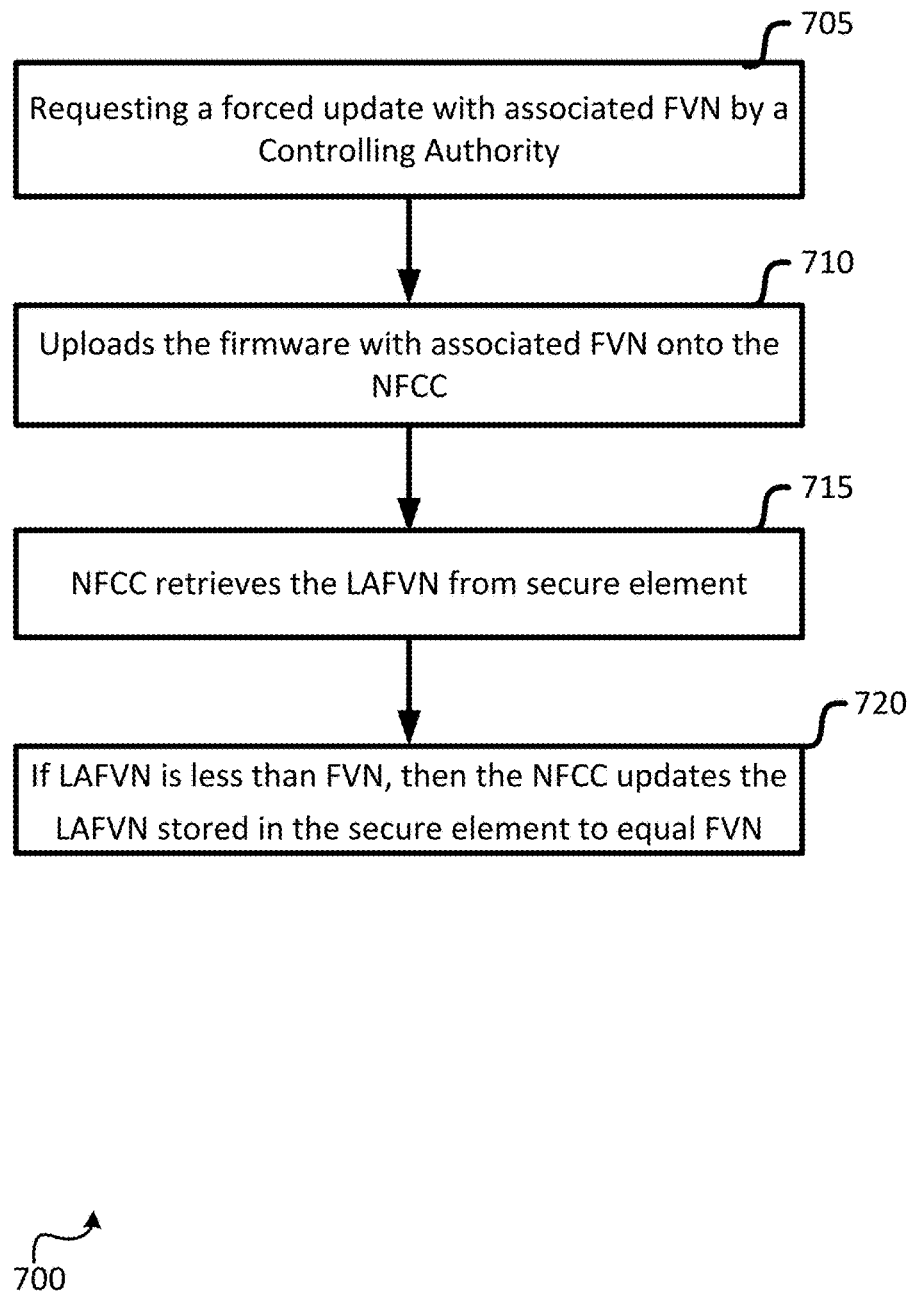
FIG. 7 is an example method of updating the last installed firmware version number stored in the secure environment after a forced update according to some embodiments.

FIG. 7 is a flowchart outlining a sequence of steps 700 for updating the LAFVN stored in the secure environment after a forced update.

During a push for a firmware update, as shown in step 705, a controlling authority can push the NFCC 145 to update its firmware. For example the controlling authority might have a requirement that the NFCC 145 needs a certain firmware version number before the NFCC 145 can communicate with the controlling authority. Therefore at step 710, the new firmware is uploaded onto the NFCC 145. According to embodiments of the present invention, once the firmware associated with FVN is loaded onto the NFCC 145, the NFCC 145 can retrieve the LAFVN in the secure element environment, in step 715. In step 720, if the NFCC 145 determines that the LAFVN is less than the FVN, then the NFCC can update the LAFVN stored in the secure element environment to equal FVN.

According to another embodiment, a controlling authority can override the LAFVN with a new number, because the controlling authority may be aware that older versions have flaws and vulnerabilities. For example, the controlling authority using a known mechanism (e.g., a GlobalPlatform) may tell the NFCC 145 that a certain version is now the latest version number.

Additionally, in the context of this invention, a firmware installation can represent a complete firmware image in its entirety, which replaces the currently loaded version, or it could represent a partial update (e.g., a patch) of the existing firmware.

A known mechanism (e.g., a GlobalPlatform standard) can be utilized to communicate with the secure element environment and upgrade the revision number. Alternatively, a proprietary communication language can be utilized to communicate with the secure element environment and upgrade the version number.

Embodiments of the present invention can be more secure than the approach that relies on internal non-volatile memory, since the SEE and TEE technology is explicitly designed to offer high levels of hardware security. Additionally, embodiments of the present invention are not restricted to a limited number of versions as with the e-Fuse technology approach.

Embodiments of the present invention take advantage of existing and highly secure remote provisioning mechanisms (e.g., as defined by GlobalPlatform) to update the required version without customer intervention.

Embodiments of the present invention only allow the revision number to incrementally increase. Therefore, a request to the secure element environment to go lower the revision number is not going to be processed.

Figure 8:
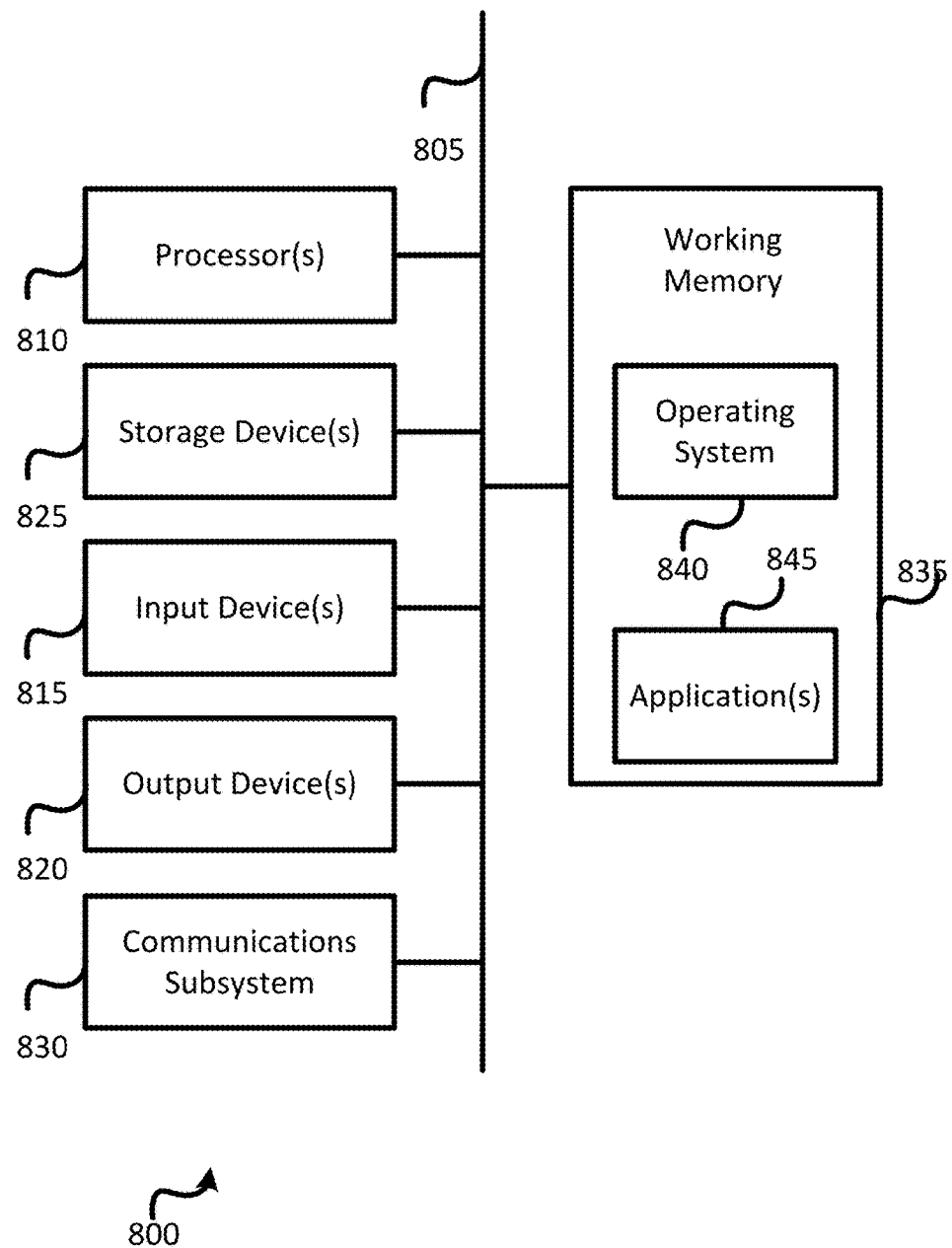
FIG. 8 illustrates an example of a computing system in which one or more embodiments may be implemented.

A computer system as illustrated in FIG. 8 may be incorporated as part of the previously described mobile device. For example, computer system 800 can represent some of the components of the mobile devices discussed in this application. Computer system 800 may perform the functions of various components of mobile device 110 of FIG. 1. FIG. 8 provides a schematic illustration of one embodiment of a computer system 800 that can perform the methods provided by various other embodiments. It should be noted that FIG. 8 is meant only to provide a generalized illustration of various components, any or all of which may be utilized as appropriate. FIG. 8, therefore, broadly illustrates how individual system elements may be implemented in a relatively separated or relatively more integrated manner.

The computer system 800 is shown comprising hardware elements that can be electrically coupled via a bus 805 (or may otherwise be in communication, as appropriate). For example, the secure communication (e.g., using the Global-Platform standard) between the NFCC 145 and the secure element environment can be over the bus 805. The hardware elements may include one or more processors 810, including without limitation one or more general-purpose processors and/or one or more special-purpose processors (such as digital signal processing chips, graphics acceleration processors, and/or the like); one or more input devices 815, which can include without limitation a mouse, a keyboard, and/or the like; and one or more output devices 820, which can include without limitation a display device, a printer, and/or the like. For example, the application processor 120 can be an example of a processor in the computer system 800.

The computer system 800 may further include (and/or be in communication with) one or more non-transitory storage devices 825, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like. For example, a SIM card 130, a SEE 220 can be an example of storage devices 825 in the computer system 800.

The computer system 800 might also include a communications subsystem 830, which can include without limitation a modem, a network card (wireless or wired), an infrared communication device, a wireless communication device, and/or a chipset (such as a Bluetooth™ device, an 802.11 device, a Wi-Fi device, a WiMax device, cellular communication facilities, NFC module 140, NFCC 145, etc.), and/or the like. The communications subsystem 830 may permit data to be exchanged with a network (such as the network described below, to name one example), other computer systems, and/or any other devices described herein. In many embodiments, the computer system 800 will further comprise a working memory 835, which can include a RAM or ROM device, as described above.

The computer system 800 also can comprise software elements, shown as being currently located within the working memory 835, including an operating system 840 (e.g., high-level application), device drivers, executable libraries, and/or other code, such as one or more application programs 845, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 825 described above. In some cases, the storage medium might be incorporated within a computer system, such as computer system 800. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 800 and/or might take the form of source and/or installable code, which, upon compilation and/or installation on the computer system 800 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 800) to perform methods in accordance with various embodiments of the invention. According to a set of embodiments, some or all of the procedures of such methods are performed by the computer system 800 in response to processor 810 executing one or more sequences of one or more instructions (which might be incorporated into the operating system 840 and/or other code, such as an application program 845) contained in the working memory 835. Such instructions may be read into the working memory 835 from another computer-readable medium, such as one or more of the non-transitory storage device(s) 825. Merely by way of example, execution of the sequences of instructions contained in the working memory 835 might cause the processor(s) 810 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 800, various computer-readable media might be involved in providing instructions/code to processor(s) 810 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 825. Volatile media include, without limitation, dynamic memory, such as the working memory 835.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 810 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 800.

The communications subsystem 830 (and/or components thereof) generally will receive signals, and the bus 805 then might carry the signals (and/or the data, instructions, etc. carried by the signals) to the working memory 835, from which the processor(s) 810 retrieves and executes the instructions. The instructions received by the working memory 835 may optionally be stored on a non-transitory storage device 825 either before or after execution by the processor(s) 810.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not restrict the scope of the claims.

What is claimed is:

1. A method for providing anti-rollback protection in a near field communication (NFC) device comprising:
   obtaining a firmware version number (FVN) associated with a first firmware installation for a NFC controller of the NFC device, wherein the NFC controller is implemented on a first substrate of the NFC device that includes no non-volatile memory and a geometry of the first substrate does not support non-volatile memory, and wherein the first firmware installation includes a first firmware;
   obtaining a lowest acceptable firmware version number (LAFVN), wherein the LAFVN is a separate firmware version number from the FVN associated with the first firmware installation for the NFC controller of the NFC device, wherein the LAFVN is stored in a secure element environment within the NFC device that cannot be accessed from outside of the NFC device, wherein the secure element environment utilizes memory of a second substrate of the NFC device separated from the first substrate, wherein a geometry of the second substrate does support non-volatile memory, wherein the LAFVN is associated with a current firmware installed on the NFC controller, and wherein the geometry of the first substrate and the geometry of the second substrate are different;
   comparing the FVN and the LAFVN;
   replacing the current firmware with the first firmware in response to determining that the FVN is greater than or equal to the LAFVN; and
   updating the LAFVN with the FVN in the secure element environment in response to determining that the FVN is greater than or equal to the LAFVN.

2. The method of claim 1, further comprising replacing the current firmware with the first firmware in response to the NFC controller determining that the FVN is equal to the LAFVN.

3. The method of claim 1, wherein the secure element environment is a standalone Secure Execution Environment (SEE) that protects against software and hardware attacks.

4. The method of claim 1, wherein the secure element environment is a Trusted Execution Environment (TEE) in a hardware-protected partition of a System-on-a-Chip (SoC).

5. The method of claim 1, wherein the LAFVN is updated using GlobalPlatform mechanisms.

6. The method of claim 1, wherein the LAFVN is updated by a controlling authority.

7. The method of claim 1, wherein the LAFVN is stored in an application in the secure element environment.

8. The method of claim 1, further comprising authenticating the first firmware installation based on a digital signature associated with the first firmware installation.

9. The method of claim 1, further comprising:
   in response to determining that the FVN is less than the LAFVN, requesting an upload of a second firmware installation with a version number greater than the LAFVN.

10. A near field communication (NFC) device for providing anti-rollback protection comprising:
    one or more processors; and
    memory storing computer-readable instructions that, when executed by the one or more processors, cause the NFC device to:
       obtain a firmware version number (FVN) associated with a first firmware installation for a NFC controller of the NFC device, wherein the NFC controller is implemented on a first substrate of the NFC device that includes no non-volatile memory and a geometry of the first substrate does not support non-volatile memory, and wherein the first firmware installation includes a first firmware;
       obtain a lowest acceptable firmware version number (LAFVN), wherein the LAFVN is a separate firmware version number from the FVN associated with the first firmware installation for the NFC controller within the NFC device that cannot be accessed from outside of the NFC device, wherein the LAFVN is stored in a secure element environment of the NFC device, wherein the secure element environment utilizes memory of a second substrate of the NFC device separated from the first substrate, wherein a geometry of the second substrate does support non-volatile memory, wherein the LAFVN is associated with a current firmware installed on the NFC device, and wherein the geometry of the first substrate and the geometry of the second substrate are different;
       compare the FVN and the LAFVN;
       replace the current firmware with the first firmware in response to determining that the FVN is greater than or equal to the LAFVN; and
       update the LAFVN with the FVN in the secure element environment in response to determining that the FVN is greater than or equal to the LAFVN.

11. The NFC device of claim 10, wherein the instructions, when executed by the one or more processors, additionally cause the NFC device to replace the current firmware with the first firmware in response to determining that the FVN is equal to the LAFVN.

12. The NFC device of claim 10, wherein the secure element environment is a stand-alone Secure Execution Environment (SEE) that protects against software and hardware attacks.

13. The NFC device of claim 10, wherein the secure element environment is a Trusted Execution Environment (TEE) in a hardware-protected partition of a System-on-a-Chip (SoC).

14. The NFC device of claim 10, wherein the LAFVN is updated using GlobalPlatform mechanisms.

15. The NFC device of claim 10, wherein the LAFVN is updated by a controlling authority.

16. The NFC device of claim 10, wherein the LAFVN is stored in an application in the secure element environment.

17. The NFC device of claim 10, wherein the instructions, when executed by the one or more processors, additionally cause the NFC device to authenticate the first firmware installation based on a digital signature associated with the first firmware installation.

18. The NFC device of claim 10, wherein the instructions, when executed by the one or more processors, additionally cause the NFC device to request an upload of a second firmware installation with a version number greater than the LAFVN in response to determining that the FVN is less than the LAFVN.

19. A non-transitory computer-readable media storing computer executable instructions that, when executed, cause a near field communication (NFC) device to:
    obtain a firmware version number (FVN) associated with a first firmware installation for a NFC controller of the NFC device, wherein the NFC controller is implemented on a first substrate of the NFC device that includes no non-volatile memory and a geometry of the first substrate does not support non-volatile memory, and wherein the first firmware installation includes a first firmware;
    obtain a lowest acceptable firmware version number (LAFVN), wherein the LAFVN is a separate firmware version number from the FVN associated with the first firmware installation for the NFC controller of the NFC device, wherein the LAFVN is stored in a secure element environment within the NFC device that cannot be accessed from outside of the NFC device, wherein the secure element environment utilizes memory of a second substrate of the NFC device separated from the first substrate, wherein a geometry of the second substrate does support non-volatile memory, wherein the LAFVN is associated with a current firmware installed on the NFC device, and wherein the geometry of the first substrate and the geometry of the second substrate are different;
    compare the FVN and the LAFVN;
    replace the current firmware with the first firmware in response to determining that the FVN is greater than or equal to the LAFVN; and
    update the LAFVN with the FVN in the secure element environment in response to determining that the FVN is greater than or equal to the LAFVN.

20. The computer-readable media of claim 19, wherein the instructions, when executed, additionally cause the NFC device to replace the current firmware with the first firmware in response to determining that the FVN is equal to the LAFVN.

21. The computer-readable media of claim 19, wherein the secure element environment is a stand-alone Secure Execution Environment (SEE) that protects against software and hardware attacks.

22. The computer-readable media of claim 19, wherein the secure element environment is a Trusted Execution Environment (TEE) in a hardware-protected partition of a System-on-a-Chip (SoC).

23. The computer-readable media of claim 19, wherein the LAFVN is updated using GlobalPlatform mechanisms.

24. The computer-readable media of claim 19, wherein the LAFVN is updated by a controlling authority.

25. The computer-readable media of claim 19, wherein the LAFVN is stored in an application in the secure element environment.

26. The computer-readable media of claim 19, wherein the instructions, when executed, additionally cause the NFC device to authenticate the first firmware installation based on a digital signature associated with the first firmware installation.

27. The computer-readable media of claim 19, wherein the instructions, when executed, additionally cause the NFC device to request an upload of a second firmware installation with a version number greater than the LAFVN in response to determining that the FVN is less than the LAFVN.

28. A near field communication (NFC) device for providing anti-rollback protection comprising:
    one or more processors;
    means for obtaining a firmware version number (FVN) associated with a first firmware installation for a NFC controller of the NFC device, wherein the NFC controller is implemented on a first substrate of the NFC device that includes no non-volatile memory and a geometry of the first substrate does not support non-volatile memory, and wherein the first firmware installation includes a first firmware;
    means for obtaining a lowest acceptable firmware version number (LAFVN), wherein the LAFVN is a separate firmware version number from the FVN associated with the first firmware installation for the NFC controller within the NFC device that cannot be accessed from outside of the NFC device, wherein the LAFVN is stored in a secure element environment of the NFC device, wherein the secure element environment utilizes memory of a second substrate of the NFC device separated from the first substrate, wherein a geometry of the second substrate does support non-volatile memory, wherein the LAFVN is associated with a current firmware installed on the NFC device, and wherein the geometry of the first substrate and the geometry of the second substrate are different;
    means for comparing the FVN and the LAFVN;
    means for replacing the current firmware with the first firmware in response to determining that the FVN is greater than or equal to the LAFVN; and
    means for updating the LAFVN with the FVN in the secure element environment in response to determining that the FVN is greater than or equal to the LAFVN.

29. The NFC device of claim 28, further comprising means for replacing the current firmware with the first firmware in response to determining that the FVN is equal to the LAFVN.

30. The NFC device of claim 28, wherein the secure element environment is a stand-alone Secure Execution Environment (SEE) that protects against software and hardware attacks.

31. The NFC device of claim 28, wherein the secure element environment is a Trusted Execution Environment (TEE) in a hardware-protected partition of a System-on-a-Chip (SoC).

32. The NFC device of claim 28, wherein the LAFVN is updated using GlobalPlatform mechanisms.

33. The NFC device of claim 28, wherein the LAFVN is updated by a controlling authority.

34. The NFC device of claim 28, wherein the LAFVN is stored in an application in the secure element environment.

35. The NFC device of claim 28, further comprising means for authenticating the first firmware installation based on a digital signature associated with the first firmware installation.

36. The NFC device of claim 28, further comprising means for requesting an upload of a second firmware installation with a version number greater than the LAFVN in response to determining that the FVN is less than the LAFVN.

37. The method of claim 1, wherein the second substrate comprises a SIM card.

38. The NFC device of claim 10, wherein the second substrate comprises a SIM card.

39. The computer-readable media of claim 19, wherein the NFC device comprises a plurality of secure element environments, and obtaining the LAFVN comprises obtaining the LAFVN from each of the plurality of secure element environments.

40. The computer-readable media of claim 19, wherein the second substrate comprises a SIM card.

41. The NFC device of claim 28, wherein the NFC device comprises a plurality of secure element environments, and the means for obtaining the LAFVN comprises means for obtaining the LAFVN from each of the plurality of secure element environments.

42. The NFC device of claim 28, wherein the second substrate comprises a SIM card.

43. The method of claim 1, wherein the geometry of the first substrate is less than 65 nanometers.

44. The method of claim 43, wherein the geometry of the second substrate is greater than 65 nanometers.

45. The computer-readable media of claim 39, wherein the NFC device further probes each of the plurality of the secure element environment for the LAFVN using a different communication mechanism to obtain the LAFVN.

46. The NFC device of claim 41, wherein the NFC device further comprises means for probing each of the plurality of the secure element environment for the LAFVN using a different communication mechanism to obtain the LAFVN.

* * * * *